Patented June 11, 1946

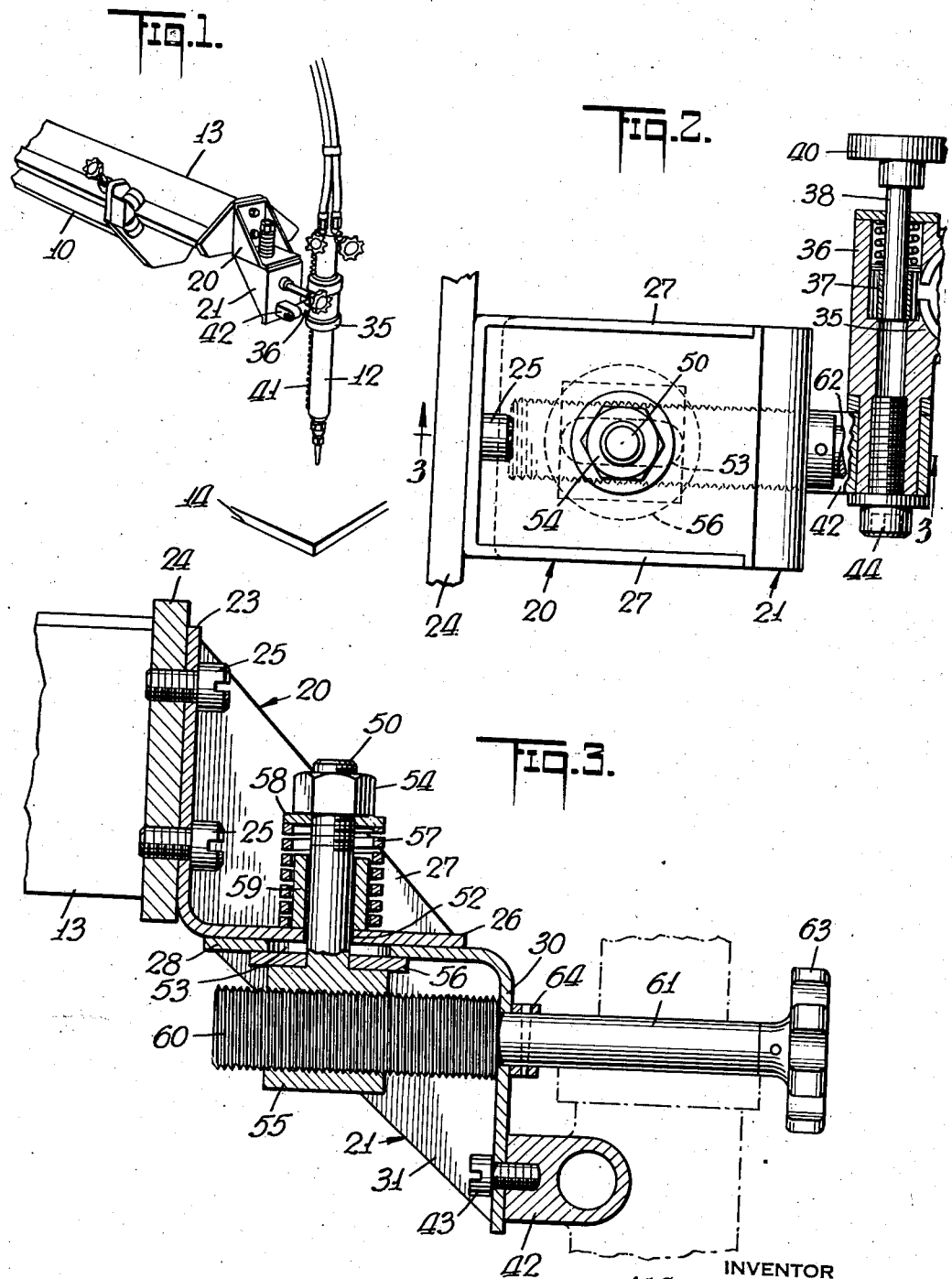

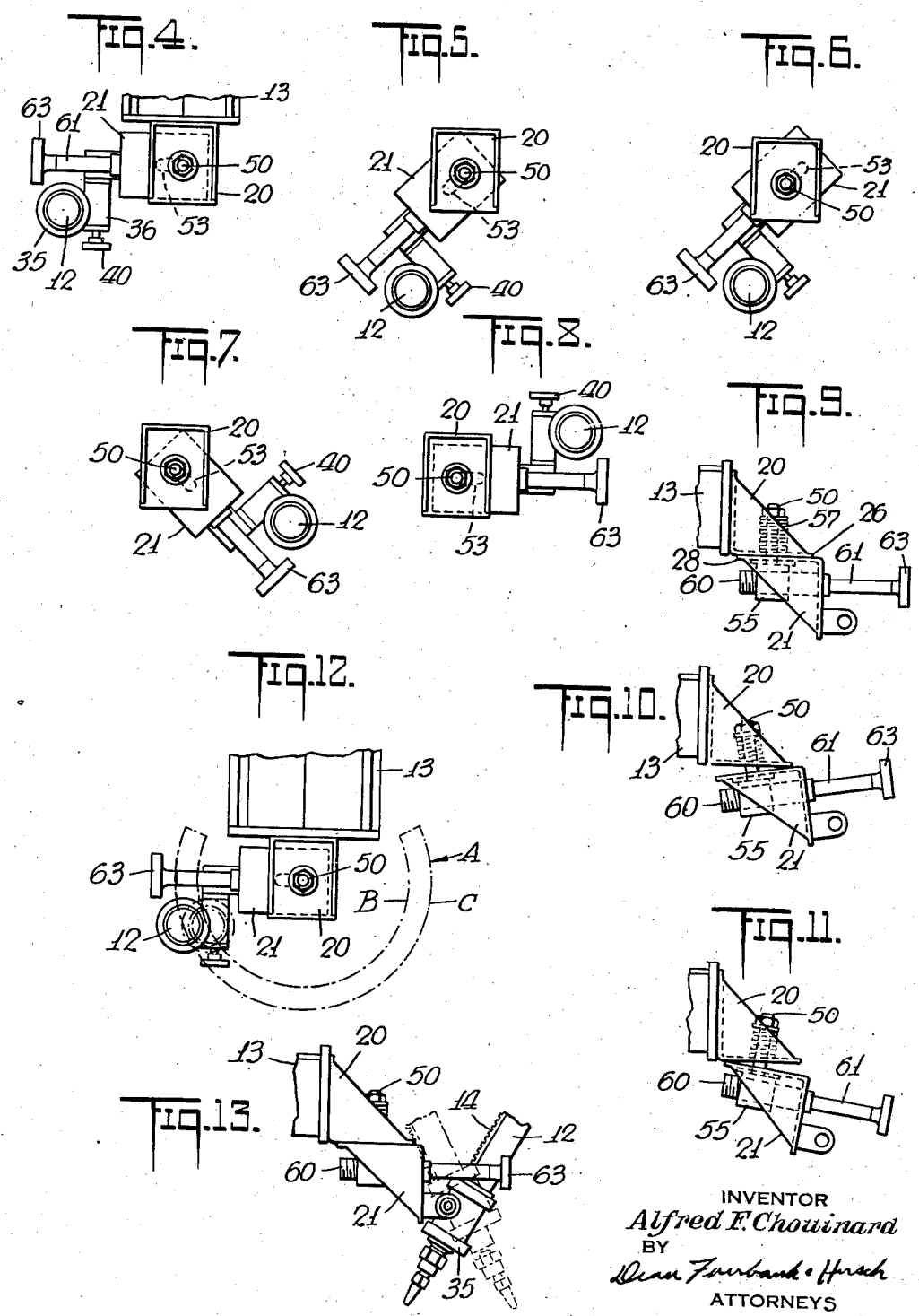

2,401,721

UNITED STATES PATENT OFFICE 2,401,721

TORCH CUTTING MACHINE

Alfred F. Chouinard, Chicago, Ill., assignor to National Cylinder Gas Company, Chicago, Ill., a corporation of Delaware Application September 29, 1943, Serial No. 504,233

9 Claims. (Cl. 266—23)

The present invention relates to a flame cutting machine, and more particularly to a device for supporting, adjusting and advancing a cutting torch on a movable part of such a machine.

In certain types of flame cutting machines, a movable frame piece carries the cutting torch and a power driven tracer unit, and is mounted and supported to cause said torch to cut along a line corresponding to that traced by said unit.

At the beginning of a flame cutting operation it is common practice to preheat the metal at one point, and thereby cause erosion and oxidization of the metal and then to release high pressure oxygen through the torch tip to form a hole in the metal. The torch is then moved to form a cut up to the desired line and then along the line. Where an enclosed figure, such as a circle or ellipse is to be cut, the cut would be ruined if it were started at the outline of the figure. It is therefore desirable in cutting such enclosed shapes to start cutting a small distance at one side of the prospective line of cut and to advance the torch towards said line of cut. If the torch be rigidly connected to the tracer, this preliminary cut is not necessarily a part of the path to be followed by the tracer on the pattern, drawing or template.

An object of the present invention is to provide a new and improved torch supporting, adjusting and advancing device which is comparatively simple and inexpensive to manufacture; which permits quick, easy and accurate adjustment of the torch with relation to the tracer unit in making a preliminary cut or for other purposes; which permits adjustment and advancement of the torch through a comparatively wide range of different operating positions; which permits adjustment in the position of the torch even after the position of the tracer unit has been set, without interfering with this set position of the tracer unit; and which can be easily operated and controlled by hand to advance the torch with respect to the tracer unit during cutting operations.

As a feature of the present invention, the torch supporting, adjusting and advancing device is constructed to permit horizontal adjusting or advancing movement of the torch through a wide arc, and also in a direction radially of said arc with respect to the tracer unit.

As a further feature, the torch supporting, adjusting and advancing device is constructed to permit quick angular movement of the torch by manually swinging said torch horizontally to the desired position, while the radial movement of said torch is manually effected by a screw. By combining these two movements, wide flexibility and accuracy in the positioning and manual control of the torch with respect to the tracer unit is afforded.

A device embodying the features of the present invention can be employed, for example, to start the cutting of an enclosed figure, at a short distance from the prospective line of cut, and to advance the torch towards said line of cut. In this manner, a design of clean regular contour free from blow hole defects is cut.

The device of the present invention may also be employed to adjust the position of the torch after the tracing and drive units have been set, to vary the position of the cut in respect to the edge of the work-piece or give different bevels or angles of cut at different points along the line of the cut.

Various other objects, features and advantages of the invention will be apparent from the following particular description, and from an inspection of the accompanying drawings, in which:

Fig. 1 is a perspective showing a portion of a flame cutting machine having a torch supporting, adjusting and advancing device embodying the present invention;

Fig. 2 shows partly in top plan view and partly in horizontal section certain of the parts shown in Fig. 1, but on a larger scale;

Fig. 3 is a vertical section of the device taken on line 3—3 of Fig. 2;

Figs. 4, 5, 6, 7 and 8 show on a smaller scale top plan views of the device in different horizontally adjusted positions;

Fig. 9 shows a side elevation of the device;

Figs. 10 and 11 show a side elevation of the device, but in reverse torch tilted positions respectively;

Fig. 12 is a top plan view of the device showing the range of horizontal adjusting movement of the torch; and Fig. 13 is a side elevation of the device showing the torch tilted with respect to the device.

The device of the present invention is applied to a flame cutting machine which, in accordance with certain aspects of the present invention, may be of any suitable type, but which is illustrated in Fig. 1 as of the cross-carriage type. This machine may, for example, be of the general type illustrated in copending application Serial No. 509,686, filed November 10, 1943, and may comprise a carriage 10 horizontally movable along tracks over a table adapted to support a tracer guide to be duplicated by a cutting torch 12. This carriage supports a second carriage 13 guided for horizontal movement on said first carriage in a direction substantially at right angles to the movement of said first carriage. The carriage 13 has secured near one end thereof a motor driven tracer unit adapted to follow or be guided on a pattern, template or drawing, and has secured at the other end the device of the present invention for supporting, adjusting and advancing the cutting torch 12 with respect to the tracer unit. As the tracer unit follows the guide, the torch 12 is correspondingly moved horizontally to cut a duplicate shape on a workpiece 14, but at any time, the position of the torch in respect to the tracer may be changed.

The torch adjusting and advancing device of the present invention comprises a pair of superposed brackets 20 and 21 having a pivotal and sliding interconnection to be more fully described. One of these brackets 20 is rigidly secured to the carriage 13 so as to constitute a part of the carriage or frame, while the other bracket 21 supports the torch 12 and is so connected to the bracket 20 that it may swing about a vertical axis to move the torch in an arcuate path, slide horizontally and radially of said path and tilt to an inclined position.

The upper bracket 20 is desirably in the form of an angle having one leg 23 extending substantially vertically and secured to an end frame piece 24 of the carriage 13 by any suitable means, as for example the studs 25, and having its other leg 26 extending substantially horizontally and outwardly away from said frame piece. Side reinforcing flanges 27 or walls are desirably provided between the two bracket legs 23 and 26 to hold them rigid in respect to each other.

The lower bracket 21 desirably similar in construction to the upper bracket 20, has a substantially horizontal leg 28 disposed on the underside of the upper bracket leg 26 and secured thereto by a pivotal and sliding interconnection in the manner to be described, and a substantially vertical leg 30 on its outer end. Reinforcing flanges or side walls 31 are desirably provided between the two lower bracket legs 28 and 30 for the same purpose as the flanges 27.

The lower bracket 21 carries the cutting torch 12 in any suitable manner, but preferably as described and claimed in copending application Serial No. 484,873. As illustrated in Figs. 1 and 2, a torch sleeve clamp 35 embraces the torch 12 and has rigid therewith a housing 36 for a pinion 37 connected to a shaft 38 having a handle 40. This pinion 37 meshes with a rack bar 41 on the torch barrel to effect adjustment in the position of said torch barrel lengthwise of the sleeve clamp 35.

The torch clamp device described in the aforesaid copending application permits angular adjustment of the torch 12 in two planes substantially at right angles to each other, so that said torch can be used for straight cutting in the position shown in Fig. 1, or for compound bevel cutting in the formation of a weld groove as shown in Fig. 13. For that purpose, the lower bracket leg 30 has secured thereto a block 42 by means of a pivot stud 43 threaded into one end of said block. The other end of the block 42 is apertured to receive snugly an axial extension of the pinion housing 36. A stud 44 is threaded into one end of the housing 36. By loosening this stud 44, the torch clamp 35 may be angularly moved about the axis of the housing 36 into position to tilt the torch 12 into desired cutting position, as for instance as shown in Fig. 13.

Pivotal adjustment of the torch 12 can also be effected about the axis of the pivot stud 43 in a plane at right angles to the plane of angular adjustment of the torch indicated, by loosening said stud and rotating the torch clamp 35 about said axis. By adjusting the torch clamp 35 about this axis, the torch 12 can be made to cut the bevel on an edge at right angles to that referred to. Any combinations of the two adjustments may be effected.

The torch clamp 35 can be reversely mounted, so that it is made to extend either on one side of the center line of the cutting machine or the other.

The pivot and slide connection between the two brackets 20 and 21 by which the torch 12 can be advanced or adjusted with respect to the tracer unit in accordance with the present invention comprises a bolt 50 passing substantially snugly through a hole 52 in the upper bracket leg 26, and loosely through an elongated slot 53 in the lower bracket leg 28. The upper end of the bolt 50 is threaded to receive a nut 54, while the lower end has integral or otherwise rigid therewith a racking sleeve 55 separated from the lower bracket leg 28 by a spacing washer 56 snugly encircling said bolt. A coil spring 57 encircling the bolt 50 seats on the upper bracket leg 26 and bears against a spring retaining washer 58 on the underside of the nut 54, so that the two brackets 20 and 21 are resiliently pressed together. A spacing ring 59 is desirably provided between the bolt 50 and the spring 57 to maintain said spring centered with respect to said bolt.

The lower bracket 21 can be swivelled about the bolt 50 by manually turning said bracket against the frictional resistance of the spring 57. This spring 57 will effectively retain the lower bracket 21 in angularly adjusted position during cutting operations, and its pressure can be adjusted by means of the nut 54.

To move the lower bracket 21 radially with respect to the upper bracket 20, there is provided a racking screw 60 threaded in the sleeve 55, and integral or otherwise rigid with a shaft 61. This shaft 61 is journalled in the lower bracket leg 30, and has a handwheel 63 secured to its outer end.

The screw 60 is retained against axial movement with respect to the lower bracket 21 by any suitable means. For example, the shaft 61 may be of reduced diameter to form on the screw 60 a shoulder engaging the inner face of the lower bracket leg 30, and a collar or ring 64 engaging the outer face of said bracket leg may be secured to said shaft.

When the handwheel 63 is turned, the corresponding rotation of the screw 60 causes said screw to move axially with respect to the bolt sleeve 55, which is retained against axial movement by the upper fixed bracket 20. Since the screw 60 is fixed to the lower bracket 21 against axial movement with respect thereto, the axial movement of said screw will cause a corresponding radial movement of the lower bracket 21 with respect to the upper bracket 20 between the limits determined by the engagement of the ends of the elongated lower bracket slot 53 with the bolt 50. Since the torch 12 is mounted on the lower bracket 21, the radial movement of this bracket is transmitted to the torch 12 to cause said torch to move radially in a substantially horizontal plane with respect to the tracer unit. A lower bracket slot 53 long enough to afford a radial adjusting range of one inch for the torch 12 will be effective for the purpose of the present invention.

The torch 12 can be swung in a horizontal plane through an arc of over 180° by holding the handwheel 63 and forcing said handle horizontally to cause the corresponding swivel of the lower bracket 21 against the resistance of the spring 57. If it is desired to move the torch 12 radially with respect to this arc, the handwheel 63 is turned. The two adjusting movements of the torch 12 angularly and radially can be effected simultaneously through manipulation of the single handwheel 63.

The outline A in dot and dash lines in Fig. 12 indicates the range of adjusting movement of the torch 12 permitted by the device of the present invention. The two concentric arcuate lines B and C of this outline represent the two angular adjusting courses of the torch 12 about a substantially horizontal plane in the two limiting radial adjusted positions of said torch, and the radial distance between these two arcuate lines B and C represents the range of radial movement of the torch 12 permitted. By proper manipulation of the handwheel 63, the torch 12 can be moved horizontally into any position in any direction and at any speed within the outline A.

Figs. 4–8 show the different horizontal adjusting positions which can be assumed by the torch 12 in accordance with the present invention. In Fig. 4, for example, the torch 12 is shown at its outermost radial position from the bolt 50 of the machine carriage 13. Fig. 5 shows the torch 12 turned about 45° from the positions shown in Fig. 4, but still at its outermost radial position. Fig. 6 shows the torch 12 in the angular position illustrated in Fig. 5 but in its radially innermost position. Fig. 7 shows the torch 12 advanced about 120° from the position shown in Fig. 4, and in its radially outermost position, and Fig. 8 shows the torch 12 advanced about 180° from the position shown in Fig. 4 and still in its radially outermost position.

Fig. 9 shows the normal relationship of the two brackets 20 and 21 with the leg 28 of the lower bracket 21 yieldably held flush against the fixed horizontal leg 26 of the upper bracket 20 by the spring 57. During normal manipulation of the handwheel 63, this relationship is maintained. If, for any reason, it is desired to tilt the torch 12 during initial cutting operations, while said torch is being advanced towards the prospective line of cut, the lower bracket 21 is tilted in a vertical plane as shown in Figs. 10 and 11 by merely pressing vertically on the handwheel 63 while said handwheel is being manipulated for angular and radial advancement of the torch in a horizontal plane. The hole 52 in the upper bracket leg 26 through which the bolt 50 passes is only slightly larger in diameter than that of said bolt to permit limited tilting of said bolt against resistance at the spring 57 when the handwheel 63 is vertically pressed as shown in Figs. 10 and 11. When this hand pressure on the handwheel 63 is released, the lower bracket 21 will be restored to the position shown in Fig. 9 under the action of said spring. Thus, by grasping the handle 63, the torch may be moved horizontally in an arcuate path by pushing on the handle; moved radially of said path by turning the handle, and tilted to incline the torch by depressing the handle. Upon releasing the handle, the torch will remain held in the adjusted position effected by the first two mentioned movements, but will automatically return to its former position after said tilting movement. The spring yieldingly holds the torch in adjusted position radially and circumferentially of the bolt and permits, but yieldingly resists, the tilting movement.

The device of the present invention can be employed, for example, to effect fine adjustments in the initial cutting position of the torch 12 after the tracer unit has been set in proper starting position with respect to the template, drawing or other guide to be traced by said unit. This adjustment is effected without in any way interfering with the setting of said tracer unit.

The device of the present invention can also be employed, for example, to start the cutting of an enclosed figure at a short distance from the prospective line of cut, and to advance the torch 12 at cutting speed under manual control towards said line of cut. By this method of procedure, formation of a blowhole on the enclosing line of cut is avoided.

As many changes can be made in the above apparatus, and many apparently widely different embodiments of this invention can be made without departing from the scope of the claims, it is intended that all matter contained in the above description or shown in the accompanying drawings shall be interpreted as illustrative and not in a limiting sense.

What is claimed is:

1. In a flame cutting machine having a horizontally movable frame part, the combination comprising a cutting torch, and a device mounting said torch on to said frame part and comprising a handwheel, means responsive to a swinging movement of said handwheel for moving said torch laterally in a horizontal plane with respect to said frame part, means permitting but yieldingly resisting angular movement of said torch upon varying the elevation of said handwheel, and means responsive to the rotation of said handwheel for moving said torch linearly in said plane.

2. A torch mounting device for a flame cutting machine comprising a pair of brackets, one of which is adapted to carry the cutting torch, while the other is adapted to be connected to a frame part of the cutting machine, a pivot interconnecting said brackets for pivotal movement of said torch carrying bracket with respect to the other bracket, and a coil spring encircling said pivot and resiliently pressing said brackets together but permitting relative tilting movement, one of said brackets having an elongated slot through which said pivot passes while the other bracket has a hole substantially snugly receiving said pivot to permit said torch-carrying bracket to be moved linearly with respect to the other bracket.

3. A torch mounting device for a flame cutting machine comprising a pair of brackets having respective contiguous plate sections, one of said brackets being adapted to be connected to a movable part of the cutting machine, while the other bracket is adapted to carry the cutting torch, a pivot bolt passing through said plate sections, a sleeve rigid with said bolt, and a screw rotatably carried by one of said brackets, threaded into said sleeve and having a handle, one of said plate sections having a hole through which said bolt passes substantially snugly, the other plate section having an elongated slot through which said bolt passes, whereby rotation of said screw causes linear slide movement of said torch carrying bracket with respect to the other bracket, and whereby a lateral movement of said handle causes a swinging movement of the torch about said pivot bolt.

4. A torch mounting device for a flame cutting machine comprising a pair of brackets, one of which is adapted to carry the cutting torch while the other is adapted to be connected to a movable part of the cutting machine, and means slidably and pivotally interconnecting said brackets, including spring means resiliently maintaining said brackets in contiguous relationship, said torch-carrying bracket being pivotally and slidably movable in a plane with respect to the other bracket and also tiltable against the action of said spring in a plane transverse to said first-mentioned plane.

5. In a flame cutting machine having a horizontally movable frame part, a torch supporting device secured to said frame part for movement therewith and comprising a torch mounting bracket, a connection between said bracket and said frame part permitting tilting movement of said bracket with respect to said frame part, and including a pivot member, means for moving said bracket along said frame part and a spring yieldingly resisting said tilting movement of said bracket in respect to said frame part.

6. A torch mounting device for a flame cutting machine, including a pair of brackets, one of which is adapted to carry the cutting torch, while the other is adapted to be connected to a frame part of the machine, a pivotal connection between said brackets, and movable along one of said brackets, a spring yieldingly resisting separation of said brackets in the direction of the axis of said pivotal connection and a handle carried by said first mentioned bracket for effecting sliding movement of said first mentioned bracket, rotation of said first mentioned bracket in respect to the other bracket and tilting of said first mentioned bracket in respect to the other bracket.

7. In a flame cutting machine having a carriage, the combination of a cutting torch and a connection between said torch and said carriage, including a carriage part presenting a substantially horizontal surface, a bracket having a torch clamp carried thereby, means for slidably adjusting said bracket along said frame part in a horizontal plane, a vertically disposed pivot member about the axis of which the bracket may turn, and means yieldingly resisting but permitting tilting of the bracket to raise or lower one edge thereof, and thereby tilt the torch.

8. A torch cutting machine including a carriage member, a torch carrying member engaging a horizontal surface of said first mentioned member, one of said members having a hole and the other having a slot, a pivot bolt extending through said hole and said slot, a spring encircling said bolt and resisting but permitting tilting of said second mentioned member away from said surface, and means engaging said bolt for effecting relative movement of said bolt and the member having said slot, along the length of said slot.

9. A torch cutting machine having a carriage member presenting a substantially horizontal surface, a torch carrying member engaging said surface, and provided with a slot, a pivot bolt extending through said first mentioned member and through said slot, a screw for moving said second mentioned member radially of said bolt, and a spring engaging said bolt and resisting said last mentioned movement, and resisting but permitting tilting movement of the second mentioned member in respect to the first mentioned one.

ALFRED F. CHOUINARD.